(12) United States Patent
Szum

(10) Patent No.: US 6,306,924 B2
(45) Date of Patent: *Oct. 23, 2001

(54) RADIATION-CURABLE GLASS COATING COMPOSITION

(75) Inventor: David M. Szum, Marengo, IL (US)

(73) Assignee: DSM Desotech, Inc., Elgin, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,925

(22) Filed: Aug. 21, 1998

Related U.S. Application Data

(62) Division of application No. 08/965,774, filed on Nov. 7, 1997, now abandoned, which is a continuation of application No. 08/568,339, filed on Dec. 6, 1995, now abandoned, which is a continuation of application No. 08/425,942, filed on Apr. 19, 1995, now abandoned, which is a division of application No. 08/298,136, filed on Aug. 30, 1994, now Pat. No. 5,664,041, which is a continuation-in-part of application No. 08/163,164, filed on Dec. 7, 1993, now abandoned.

(51) Int. Cl.$^7$ ................................. C08F 2/46; G02B 6/22
(52) U.S. Cl. ......................... 522/114; 522/96; 522/118; 522/120; 522/127; 522/115; 522/171; 428/380; 428/378; 428/383; 385/128; 385/145
(58) Field of Search ......................... 522/171, 90, 96, 522/182, 180, 113, 115, 118, 120, 121, 127; 428/380, 378, 383; 385/128, 145

(56) References Cited

U.S. PATENT DOCUMENTS

| | | | |
|---|---|---|---|
| 3,816,152 | 6/1974 | Yates | 106/287 SE |
| 4,272,586 | 6/1981 | Ando et al. | 522/172 |
| 4,640,938 * | 2/1987 | Romer et al. | 522/79 |
| 4,735,856 | 4/1988 | Schultz et al. | 428/366 |
| 4,849,462 | 7/1989 | Bishop | 522/97 |
| 5,039,716 | 8/1991 | Vara et al. | 522/96 |
| 5,091,211 * | 2/1992 | Richard | 427/44 |
| 5,095,086 | 3/1992 | Pawar et al. | 528/17 |
| 5,112,658 | 5/1992 | Skutnik et al. | 428/34.6 |
| 5,128,387 * | 7/1992 | Shustack | 522/96 |

(List continued on next page.)

FOREIGN PATENT DOCUMENTS

| | | |
|---|---|---|
| 2252344 | 4/1986 | (JP) . |
| 01067284 | 9/1987 | (JP) . |
| 8502106 | 7/1985 | (NL) . |
| 90/13523 * | 11/1990 | (WO) . |

OTHER PUBLICATIONS

International Search Report of International Application No. PCT/NL 94/00308.

*Primary Examiner*—James J. Seidleck
*Assistant Examiner*—Sanza L. McClendon
(74) *Attorney, Agent, or Firm*—Pillsbury Winthrop LLP

(57) ABSTRACT

This invention provides an improved coating composition for glass substrates that comprises a tetrasubstituted compound. The introduction of a tetrasubstituted compound in a coating composition for a glass substrate, and in particular an optical fiber, acts to delay the rate of deterioration of the glass or optical fiber due to moisture, and improves adhesion between the glass substrate and the coating composition. The introduction of a tetrasubtituted compound into a polymeric coating composition also improves the interlayer adhesion when more than one coating is applied to a glass substrate. This invention further relates to an outer primary coating composition or matrix material that comprises an acid functional ethylenically unsaturated monomer. This invention also provides an improved coated glass substrate having a decreased rate of deterioration due to moisture, improved adhesion between the glass substrate and the coating composition and between the various coatings, wherein the coating composition comprises a tetrasubstituted compound.

20 Claims, 1 Drawing Sheet

U.S. PATENT DOCUMENTS

| | | | |
|---|---|---|---|
| 5,128,391 | * 7/1992 | Shustack | 522/92 |
| 5,136,679 | 8/1992 | Broer et al. | 385/128 |
| 5,146,531 | 9/1992 | Shustack | 385/127 |
| 5,157,755 | 10/1992 | Ooe et al. | 385/128 |
| 5,181,269 | 1/1993 | Petisce | 385/128 |
| 5,212,757 | 5/1993 | Brownlow et al. | 385/127 |
| 5,214,734 | 5/1993 | Inniss et al. | 385/128 |
| 5,229,433 | * 7/1993 | Schunck et al. | 522/96 |
| 5,232,783 | 8/1993 | Pawar et al. | 428/429 |
| 5,385,955 | 1/1995 | Tarshani et al. | 522/31 |
| 5,502,145 | * 3/1996 | Szum | 528/28 |
| 5,595,820 | * 1/1997 | Szum | 428/378 |
| 6,014,488 | * 1/2000 | Shustack | 385/128 |

* cited by examiner

RADIATION-CURABLE GLASS COATING COMPOSITION

CROSS-REFERENCE TO RELATED APPLICATION

This is a division of application Ser. No. 08/965,774, filed Nov. 7, 1997 now abandoned, which is a continuation of Ser. No. 08/568,339 filed Dec. 6, 1995, now abandoned; which is a continuation of Ser. No. 08/425,942 filed Apr. 19, 1995 now abandoned; which is a division of Ser. No. 08/298,136 filed Aug. 30, 1994, now U.S. Pat. No. 5,664,041; which is a CIP of Ser. No. 08/163,164 filed Dec. 7, 1993, now abandoned.

TECHNICAL FIELD

This invention relates to improved curable coating compositions for glass substrates and to glass substrates, such as optical fibers, coated with the compositions.

BACKGROUND OF THE INVENTION

It has long been known that glass substrates are weakened upon exposure to water. For example, moisture in air can cause weakening and the eventual breakage of glass.

Typically, glass substrates have been coated with polymeric compositions for various reasons, such as to protect and preserve the strength of a glass object, to prevent damage during handling, and to prevent moisture from attacking the glass substrate. In addition, coatings have been applied to optical fibers to decrease the microbending of the optical fiber, which can reduce the transmission of electromagnetic radiation through the fiber. However, it has been found that many coating compositions are water permeable, and therefore not very effective in protecting the glass substrate from moisture.

In addition to causing the weakening of glass substrates, moisture can also cause polymeric compositions that have been applied to the glass substrate to break away, i.e., delaminate, from the glass surface. The delamination of a polymeric composition can result in a weakened glass substrate, as the polymeric coating no longer protects the glass from environmental stresses.

Various coating compositions have been used to prevent the deterioration of glass substrates, and specifically optical fibers, to improve the useful life of the glass substrate to which it is applied. For example, U.S. Pat. No. 5,000,541, issued to DiMarcello et al., teaches a method for hermetically sealing an optical fiber with carbon, which prevents water from contacting the optical fiber, and thus prolongs the useful life of the optical fiber. Similarly, U.S. Pat. No. 4,849,462, issued to Bishop et al., teaches the incorporation of various organofunctional silanes into a coating composition to improve the adhesion between a coating composition for an optical fiber and the optical fiber, particularly in moist environments.

Likewise, U.S. Pat. No. 5,214,734, issued to Inniss et al., teaches the incorporation of particulate silica in a polymeric coating composition to increase the fatigue resistance of an optical fiber or glass to moisture.

Similarly, U.S. Pat. No. 5,136,679, issued to Broer et al., shows an inner primary coating that comprises an acidic phosphorus compound as an adhesion promotor. However, because it is hypothesized in the Broer et al. patent that an acid medium develops near the interface of the glass fiber and the first (inner primary) coating composition due to the presence of the phosphorus compound, this patent teaches away from the use of acidic phosphorus compounds in an outer primary coating or any other coating layer that does not directly contact the optical glass fiber.

Many coating compositions have drawbacks that make them unsuitable for certain applications. For example, some of the compositions may be too expensive to use in the production of low cost optical fibers or glass objects, and the introduction of particulate matter into a coating composition as disclosed in the Inniss et al. patent can present problems such as scratching of the pristine optical glass fiber, resulting in breakage at low tensile loads; a turbid coating composition which has a tendency to gel; and other processing problems that are commonly encountered when working with particulate matter.

Coatings which are modified with organofunctional silanes, such as the above-referenced Bishop et al. patent, do improve the wet adhesion of a coating applied to an optical fiber substrate, but do not significantly improve the wet adhesion retention capability of the coating, when compared to this invention.

SUMMARY OF THE INVENTION

This invention provides an improved coating composition for glass substrates, preferably silica-based optical fibers, wherein the composition contains a tetrasubstituted compound having the formula:

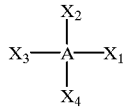

wherein A is Si, Ti or Zr, and where $X_1$, $X_2$, $X_3$ and $X_4$ are hydrolyzable groups that can be hydrolyzed from the tetrasubstituted compound in the presence of water.

Preferably, the hydrolyzable groups $X_1$, $X_2$, $X_3$ and $X_4$ are independently an alkoxy group or a group containing ethylenic unsaturation.

Preferably, the tetrasubstituted compound is present in the coating composition in an amount in the range of about 0.1% to about 50% by weight of the entire composition. More preferably, this amount is about 0.1 to about 30%, and most preferably about 0.5 to about 10%.

This invention further relates to a coating composition having an adhesion retention, as defined below, of at least 80%, preferably at least 85%, and most preferably at least 95%.

In addition, this invention provides coating compositions for glass substrates that comprise a strong acid functional ethylenically unsaturated monomer.

This invention also provides improved glass substrates that are coated with at least one polymeric coating composition that comprises a tetrasubstituted compound and/or a strong acid functional ethylenically unsaturated monomer. The resulting coated glass substrates have decreased rates of deterioration due to moisture attack, improved adhesion between the glass substrate and the coating adjacent to the glass, and improved adhesion between coating layers if more than one coating layer containing a tetrasubstituted compound is applied to the glass substrate.

DETAILED DESCRIPTION OF THE INVENTION

Figure 1:
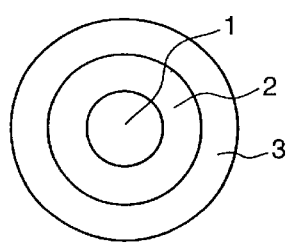
FIG. 1 is a cross-sectional view of an optical fiber having two coatings.

The present invention contenmplates a glass substrate, and specially, a silica-based optical fiber that is coated with a least one polymeric coating composition. Most glass substrates, such as glass bottles, are usually coated with only one polymeric coating. An optical fiber substrate, however, usually has more than one coating. When a substrate has more than one coating, the various coating compositions may be the same or different. As used herein, the word "substrate" shall mean a glass object or a silica-based optical fiber. Some examples of glass objects include, but are not limited to, bottles light bulbs, windows. In a preferred embodiment, the glass substrate is a silica-based optical fiber.

The present invention is directed to an improved coating composition for glass substrates, wherein the composition contains a tetrasubstituted compound having the follow formula:

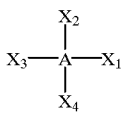

wherein A is Si, Ti or Zr, and where $X_1$, $X_2$, $X_3$ and $X_4$ are hydrolyzable groups that can be hydrolyzed from the tetrasubstituted compound in the presence of water.

Examples of hydrolyzable groups include, but are not not limited to, halogen (e.g., chlorine, fluorine and bromine), formyloxy, acetoxy, propionyloxy, valeryloxy, stearoyloxy, benzoyloxy, naphthoyloxy, toluyloxy, maleoyloxy, alkoxy, alkylthio, vinyloxy, allyloxy, vinyletheroxy, methacryloxy and acryloxy. These and other groups herein are defined according to the IUPAC Nomenclature Rules (1969).

The addition of a tetrasubstituted compound to the polymeric composition delays glass strength deterioration, provides excellent wet adhesion of the coating to a substrate and improves adhesion between adjacent coating layers that both contain a tetrasubstituted compound. Glass strength deterioration can typically be measured by industry standard static and/or dynamic fatigue tests.

When a coated optical fiber is subjected to humid conditions, the adhesion of the coating to the glass fiber decreases. The adhesion retention, that is the percentage of adhesion remaining under defined humid conditions, as compared with the adhesion under dry conditions, should be high. the coating compositions according to the invention show an adhesion retention of a least about 80%, preferably at least about 85%, and more preferably at least about 95%. The adhesion retention (Q) is measured as described below. According to the invention it is even possible to provide coating compositions showing a higher adhesion to glass under humid conditions than under dry conditions, i.e., the adhesion retention can be higher than 100%.

The tetrasubstituted compound may be added to various coating compositions that are known in the art. For example, U.S. Pat. No. 5,112,658, to Skutnik et al., issued May 12, 1992, discloses coating compositions for glass containers. The Skutnik et al. patent is hereby incorporated by reference. Preferably, the substrates used in the present invention are mostly silicon-based. The addition of a tetrasubstituted compound to a polymeric coating composition provides for better strength retention of the substrated coated therewith.

Preferably, the hydrolyzable groups $X_1$, $X_2$, $X_3$ and $X_4$ are independently an alkoxy group or a group containing ethylenic unsaturation.

Preferably, the alkoxy group is a $C_1$ to $C_6$ alkoxy. Upon hydrolysis, the $C_1$ to $C_6$ alkoxy groups form volatile alcohols, which can escape from the coating composition by evaporation. Examples of such $C_1$ and $C_6$ alkoxy groups include, but are not limited to, methoxy, ethoxy, isopropoxy, n-butoxy, sec-butoxy, isobutoxy and tert-butoxy. Most preferably, the alkoxy groups are methoxy and ethoxy.

When the hydrolyzable group contains ethylenic unsaturation, the ethylenic unsaturation may react with other ethylenically unsaturated compounds in the coating composition. Such hydrolyzable groups containing ethylenic unsaturation include, but are not limited to, vinyloxy, allyloxy, vinyletheroxy, methacryloxy and acryloxy.

It is contemplated that $X_1$, $X_2$, $X_3$ and $X_4$ may be the same or different. Most preferably, the tetrasubstituted compound is a tetrasubstituted silane, particularly when the substrated is silica-based. Similary, if the substrate contains Ti, the tetrasubstituted compound preferably contains Ti, and likewise, if the substrate contains Zr, the tetrasubstituted compound preferably contains Zr.

Preferably, the tetrasubstituted compound is a liquid so that it may be easily added to a coating composition. Alternatively, the tetrasubstituted compound may be a solid that is soluble in the polymeric coating composition.

The improved coating compositions of the present invention may contain one tetrasubstituted compound or it may contain a mixture of tetrasubstituted compounds. Typically, the tetrasubstituted compound is present in the coating composition in an amount sufficient to delay deterioration of the substrate upon which the composition containing the tetrasubstituted compound is coated. Preferably, the tetrasubstituted compound is present in the coating composition in the range of about 0.1% to about 50% by weight of the entire composition. However, an effective amount of tetrasubstituted compound for a particular coating composition may vary and can be determined by trial and error.

Tetramethoxy silane and tetraethoxy silane may be purchased as tetramethyl orthosilicate and tetraethyl orthosilicate respectively, from the Aldrich Chemical Company of Milwaukee, Wis. Glass substrates are typically coated with only one coating composition. An optical fiber substrate, however, may be coated with more than one coating composition. In a substrate having more than one coating composition, such as an optical fiber, the various coatings may have the same composition or the coatings may have different compositions. For example, some of the coatings may contain a tetrasubstituted compound and some of the coatings may not.

The compositions according to the present invention may be used as an inner primary coating. When used as an inner primary coating, the composition is preferably formulated such that, when cured, the composition results in a coating having a $T_g$ below about 23° C. and a modulus in the range of about 0.1 to about 50 MPa. More preferably, the $T_g$ is below 0° C. and the modulus is in the range of 0.1 to 10 MPa.

The invention further relates to outer primary coating or matrix compositions that comprises a strong acid functional ethylenically unsaturated monomer.

The strong acid functional ethylenically unsaturated monomer is a monomer comprising ethylenic unsaturation and a strong acid group. The ethylenically unsaturated group may be a vinyl, allyl, vinylether or (meth)acrylate group. A non-functional alkyl chain may connect the ethylenic unsaturated to the strong acid group. The strong group may be any acid group that completely dissociates in water. Examples of such strong acid functional groups include, but are not limited to, phosphoric acid, sulphuric acid and sulfonic acid groups. Most preferably, the strong acid functional groups are phosphoric acid groups.

An example of a strong acid functional ethylenically unsaturated monomer is phosphoric acid monoacrylate, commercially available as Ebecryl 170 through Radcure Specialties in Atlanta, Ga. Other such strong acid functional ethylenically unsaturated monomers are also suitable. Another example is 2-acrylamido-2-methylpropanesulfonic acid, commerically available as Lubrizol™ 2401 through the Lubrizol Corporation in Wickliffe, Ohio. The strong acid functional ethylenically unsaturated monomer is preferably present in the range of about 0.1% to about 10%, more preferably in the range of about 0.1% to about 5% by weight of the entire outer primary coating or matrix composition.

In certain applications, it is desirable to use a matrix composition to hold a plurality of optical fibers together, and various matrices and their use are know to those skilled in the art. For example, a matrix composition can be the same as the outer primary coatings exemplified herein. It is contemplated that a strong acid functional ethylenically unsaturated monomer may be incorporated into the matrix composition to obtain the strength retention benefit. It is also recognized that in a plurality of optical fibers employing a matrix, that the strong acid functional ethylenically unsaturated monomer may be independently found in the outer primary coating, any other coating, or the matrix, or in any combination thereof. That is, the strong acid functional ethylenically unsaturated monomer may be found in any coating other than the inner primary coating. Also comtemplated are optical fiber ribbons, which are known to those skilled in the art, that comprise a matrix material that comprises a tetrasubstituted compound and/or an acid functional ethylically unsaturated monomer.

Preferably, the outer primary coating composition, when cured, results in a coating having a $T_g$ above 23° C. and a modulus in the range of about 100 to about 3,000 MPa. Most preferably, the outer primary coating composition, when cured, results in a coating having a $T_g$ above 40° C. and a modulus in the range of about 300 to about 2,000 MPa.

In one of the preferred embodiments of the invention, at least the inner coating contains a tetrasubstituted compound and at least one of the outer primary coatings comprises an ethylenically unsaturated monomer which has a strong acid functional group.

FIG. 1 illustrates a coating configuration that is available in the optical fiber industry. The central substrated labeled 1 is a glass substrate, in this case, a silica-based optical fiber. The coating layer 2, which is directly adjacent to the glass, is typically termed the inner primary coating or innermost layer. The coating layer 3 that surrounds the inner primary coating is typically termed the outer primary coating. As used herein, the term "inner primary coating" is any coating directly adjacent to a silica-based optical fiber, while the term "outer primary coating" will apply to any coating or coatings which overcoat the inner primary coating.

Figure 2:
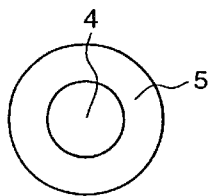
FIG. 2 is a cross-sectional view of an optical fiber having one coating.

FIG. 2 illustrates another coating configuration for glass substrates, which is also available in the optical fiber industry. The central substrate labeled 4 is the glass substrate, in this case, a silica-based optical fiber. The sole coating layer labeled 5 is generally termed a single coat and is characterized by the fact that it is the only coating layer present on the glass substrate. As used herein, the term "single coat" is any coating adjacent to a glass optical fiber substrate that is not immediately overcoated.

It is understood that any or all of the coating layers described including the inner primary, outer primary and matrix, may independently contain a tetrasubstituted compound to obtain the strength retention benefit. In one embodiment of the present invention, the outer primary coating contains a tetrasubstituted compound to obtain the strength retention benefit.

The addition of the tetrasubstituted compound to the inner primary coating, in addition to obtaining the strength retention benefit, has the additional desired benefit of improving the adhesion of the coating to the glass under high humidity conditions. In a preferred embodiment, the coating that is adjacent to the substrate, i.e., the inner primary coating, contains a tetrasubstituted compound to obtain the improved adhesion benefit.

A coating composition of the present invention may be prepared by combining curable oligomers, monomers and/or polymers along with other components and the selected tetrasubstituted compound. For example, the oligomers useful in the compositions of the present invention may be the reaction product of a hydroxy functional monomer containing ethylenic unsaturation and an isocyanate that is then further reacted with a hydroxy functional polyether that contains branched, oxyalkylene repeating units. The branched, oxyalkylene repeating units have about 2 to about 6 carbon atoms.

The resulting oligomers have molecular weights that are generally in the range of about 700 to about 20,000, and preferably about 1000 to about 10,000. They are also substantially free of isocyanate functionality.

These end-capped oligomers can be combined with reactive diluents, photoinitiators, antioxidants and light stabilizers to form the radiation curable compositions of the present invention.

Any of a wide variety of organic polyisocyanates, alone or in admixture, can be reacted with the hydroxy functional monomer containing ethylenic unsaturation. The reaction product of the isocyanate and the hydroxy functional monomer is then further reacted with the polyether containing branched chain, oxyalkylene repeating units to form polyether oligomers.

Representative diisocyanates include isophorone diisocyanate (IPDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the isocyanates are TDI and IPDI.

The isocyanate is reacted with the hydroxy functional ethylenically unsaturated monomer. These hydroxy functional ethylenically unsaturated monomers are preferably acrylates, vinyl ethers, maleates, fumarates or other unsaturated functional groups.

In the reaction between hydroxy and isocyanate groups, it is preferred to employ a stoichiometric balance between hydroxy and isocyanate functionality and to maintain the reactants at a reaction temperature of at least about 25° C. The hydroxy functionality should be substantially consumed. the mole ratio of the isocyanate to the hydroxy functional ethylenically unsaturated monomer is in the range of about 3:1 to about 1.2:1, and preferably about 2:1 to about 1.5:1. The hydroxy functional ethylenically unsaturated monomer attaches to the isocyanate via an urethane linkage.

The reaction product of the isocyanate and the ethylenically unsaturated monomer is further reacted with the polyether containing branched, oxyalkylene repeating units. The resulting polyether oligomer is end-capped with the reaction product from the isocyanate/ethylenically unsaturated monomer reaction. By "end-capped" it is meant that a functional group caps each of the two ends of the polyether.

Suitable monomers that are useful to endcap the polyether with the desired (meth)acrylate functional groups include hydroxy functional acrylates such as 2-hydroxyethyl acrylate, 2-hydroxypropyl acrylate and the like. Suitable monomers which will endcap the polyether with the desired vinyl ether functional groups include 4-hydroxybutyl vinyl ether, and triethylene glycol monovinyl ether. Suitable monomers which will endcap the polyether with the desired maleate functional group, include maleic acid and hydroxy functional maleates.

As stated above, the product of the reaction of the isocyanate and ethylenically unsaturated hydroxy functional monomer is reacted with a polyether that contains branched, oxyalkylene repeating units. These branched, oxyalkylene repeating units preferably contain about 2 to about 6 carbon atoms. Polyether copolymers that contain both branched and non-branched oxyalkylene repeating units are also suitable. Preferably, the polyether contains at least 20 percent by weight of above-described branched, oxyalkylene repeating units.

The preferred polyethers are poly(oxisopropylene), marketed by Union Carbide, Danbury, Conn., and poly(oxymethyltetramethylene). Poly(oxymethyltetramethylene) is preferably the polymerization product of 3-methyltetrahydrofuran, which has undergone a ring opening polymerization.

If the polyether contains repeating units in addition to the branched, oxyalkylene repeating units described above, these repeating units are preferably oxyalkylene repeating units with about 2 to about 5 carbon atoms. A polyether which is the polymerization product of 20 percent by weight of 3-methyltetrahydrofuran and 80 percent by weight of tetrahydrofuran, both of which have undergone a ring opening polymerization, is an example of a suitable polyether containing both branched and non-branched oxyalkylene repeating units. This polyether copolymer is marketed as PTGL 1000 by the Hodogaya Chemical Company of Japan.

The isocyanate/hydroxy functional monomer reaction product attaches to the polyether containing branched, oxyalkylene repeating units via an urethane linkage. The urethane reaction by which this linkage is formed takes place in the presence of a catalyst. Catalysts for the urethane reaction, such as diazabicyclooctane crystals and the like, are suitable for this purpose. The mole ratio of the isocyanate/hydroxy functional monomer reaction product to the polyether with branched, oxyalkylene repeating units is in the range of about 3:1 to about 1.2:1, preferably about 2:1 about 1.5:1.

Unreacted isocyanate groups can be present in the endcapped polyether oligomer, but are preferably minimized to less than about 0.1 percent by weight to provide an oligomer which contains substantially no free isocyanate groups. It is preferred that there be no detectable isocyanate present.

The endcapped polyether oligomer is then combined with a reactive diluent and a photoinitiator to form a radiation curable coating composition of the present invention. The encapped polyether oligomer is about 10 weight percent to about 80 weight percent of the coating composition of the present invention and preferably about 15 to about 50 weight percent by weight of the coating composition.

While polyether oligomers are extensively discussed herein, it is understood that any conventional coating composition can be modified as taught herein. Other coating compositions may include, but are not limited to, compositions containing oligomers based on polyolefins, e.g., polybutadienes (saturated or unsaturated), polycarbonates, polyesters and combinations thereof. In the polyether oligomers discussed herein above, as well as in oligomers based on polymers other than polyethers, the above mentioned urethane linkages may be replaced with linkages based on urea, thiourea, or any other linking moiety.

The examples of polymeric coating compositions set forth above are intended to be illustrative of the coating compositions that may be employed in the present invention. It is recognized that any coating composition in which a tetrasubstituted compound may be incorporated falls within the scope of this invention.

Other components that may be present in the composition include, but are not limited to, light sensitive and light absorbing components, catalysts, initiators, lubricants, wetting agents, organofunctional silanes, antioxidants, and stabilizers.

A good example of a specific inner primary coating composition that may be used in the present invention is described in U.S. Pat. No. 4,682,851 to Ansel, issued Jul. 28, 1987, which is hereby incorporated by reference. A suitable inner primary polymeric composition for application to an optical fiber should have an appropriate viscosity for application, should be fast curing, should be compliant enough at low temperatures to limit optical loss, and should be resistant to penetration from most chemicals or solvents that the fibers are likely to encounter in practical use.

A good example of a specific outer primary coating composition that may be used in the present invention is described in U.S. Pat. No. 4,472,019, to Bishop et al., issued Sep. 18, 1994, which is hereby incorporated by reference. An outer primary coating should have an appropriate viscosity for application, should be fast curing, should be tough enough to protect the fiber from mechanical handling, should adhere to the inner primary coating well enough to allow complete and easy removal of all coatings from the optical fiber, and should be resistant to penetration from most chemicals or solvents that the fibers are likely to encounter in practical use.

A good example of a specific single coat composition that may be used in the present invention is described U.S. Pat. No. 4,932,750, to Ansel et al., issued Jun. 12, 1990, which is hereby incorporated by reference. In the case of an optical fiber, a suitable single coat composition for application should have an appropriate viscosity for application, should be fast curing, should be compliant enough at low temperatures to limit optical loss, should be tough enough to limit abrasion, and should protect the optical fiber from exposure to most chemicals or solvents.

A good example of a specific glass substrate coating composition that may be used in the present invention is described in U.S. Pat. No. 5,112,658, to Skutnik, et al., issued on May 12, 1992, which is hereby incorporated by reference. In the case of a generic glass coating, a suitable coating composition for application to nonoptical fiber glass substrates should have an appropriate viscosity for application, should be tough enough to limit abrasion, and should be fast curing.

In producing a coated substrate, a liquid coating composition is applied to a substrate and subsequently cured. Typically, the cure is affected using ultraviolet or visible radiation. However, other methods are available. For example, thermal curing, usually in the presence of an initiator, may be used. Alternatively, the coating can be cured by electron beam irradiation where no catalyst is required. More than one coating may be applied. Typically, a first coating is applied and cured followed by a second coating and so on until the desired number of coatings have been applied. Alternatively, the layers can be applied on top of each other as liquids, described herein as a wet-on-wet process, with one final curing step at the end.

In many applications involving optical fibers, it is desirable to have more than one coating layer, e.g., at least one inner and one outer primary coating, which are easily removed or stripped as a unit without leaving any coating residue on the glass fiber. To further enhance the strippability and enhance strength retention, the inner and outer primary coatings may both be modified with a tetrasubstituted compound. The tetrasubstituted compound is preferably present in each coating composition in the range of about 0.1% to about 50% by weight of the entire coating composition.

An inner primary coating could, for example, comprise 30–80 wt % (meth)acrylate oligomer, 0–70 wt % (meth)acrylate monomer, 0–3 wt % antioxidant, 0.5–10 wt % photoinitiator, 0–30 wt % organofunctional silane and 0.1–30 wt % tetrasubstituted compound. As an example, but without being limited thereto, such a coating could comprise about 60 wt % oligomer, obtained by reacting hydroxyethyl acrylate, a diisocyanate such as toluene diisocyanate and a polyoxyalkylene diol, such as polypropylene glycol, about 33 wt % phenoxyethyl acrylate as a monomer, about 1 wt % thiodiethylene bis (3,5-di-tert-butyl-4-hydroxy) hydrocinnamate as an antioxidant, about 3 wt % 1-hydroxycyclohexyl phenyl ketone as a photoinitiator, and about 3 wt % tetraethoxy silane.

Another example of an inner primary coating, but without being limited thereto, could comprise about 60 wt % oligomer, obtained by reacting hydroxyethyl acrylate, a diisocyanate such as isophorone diisocyanate and a polyalkylenediol, such as hydrogenated 1,2-polybutadiene diol about 13 wt % nonyl phenol acrylate as a monomer, about 10 wt % lauryl acrylate as a comonomer, about 1 wt % thiodiethylene bis(3,5-di-tert-butyl-4 hydroxy) hydrocinnamate as an antioxidant, about 3 wt % 1-hydroxycyclohexyl phenyl ketone as a photoinitiator, and about 3 wt % tetra(acryloxyethoxy) silane.

An outer primary coating could, e.g., comprise 30–80 wt % (meth)acrylate oligomer, 0–70 wt % (meth)acrylate monomer, 0–3 wt % antioxidant, 0.5–10% photoinitiator, and 0.1–30 wt % tetrasubstituted silane. An example of an outer primary coating, but without being limited thereto. could comprise about 40 wt % oligomer, obtained by reacting hydroxyethyl acrylate, a diisocyanate such as isophorone diisocyanate and a hydrophobic polyester diol, such as polycaprolactone diol, about 25 wt % bisphenol diglycidyl ether diacrylate as a monomer, about 10 wt % trimethylolpropane triacrylate as a monomer, about 18 wt % phenoxyethyl acrylate as a monomer, about 1 wt % thiodiethylene bis (3,5-di-tert-butyl-4 hydroxy) hydrocinnamate as an antioxidant, about 3 wt % 1-hydroxycyclohexyl phenyl ketone as a photoinitiator, and about 3 wt % tetraethoxy silane.

According to another embodiment an outer primary coating could, e.g., comprise 30–80 wt % (meth)acrylate oligomer, 0–70 wt % (meth)acrylate monomer, 0–3 wt % antioxidant, 0.5–10% photoinitiator, and 0.1–10% strong acid functional acrylate. As an example, but without being limited thereto, such a coating could comprise about 40 wt % oligomer, obtained by reacting hydroxyethyl acrylate, a diisocyanate such as toluene diisocyanate and a polyalkylene diol, such as polypropylene glycol, about 25 wt % bisphenol. A diglycidyl ether diacrylate as a monomer, about 10 wt % trimethylolpropane triacrylate as a monomer, about 20 wt % phenoxyethyl acrylate as a monomer, about 1 wt % thidiethylene bis (3,5-di-tert-butyl-4 hydroxy) hydrocinnamate as an antioxidant, about 3 wt % 1-hydroxycyclohexyl phenyl ketone as a photoinitiator, and about 1 wt % phosphoric acid acrylate.

The following examples are intended to illustrate particular embodiments of the invention, and are not intended to limit the claims or any part of the specification in any way.

EXAMPLES

Example 1

Example Composition of an Inner Primary Fiber Optic Coating Modified with a Tetraalkoxy Silane

| COMPONENT | WEIGHT % |
| --- | --- |
| HEA-TDI-PPG1025-TDI-HEA* | 62.0 |
| Phenoxyethyl Acrylate | 30.0 |
| Thiodiethylene bis (3,5-di-tert-butyl-4-hydroxy) hydrocinnamate | 1.0 |
| 1-Hydroxycyclohexyl phenyl ketone | 3.0 |
| Gamma mercaptopropyl trimethoxy silane | 1.0 |
| Tetraethoxy silane | 3.0 |

*This oligomer is the reaction product of 2-hydroxy ethyl acrylate (HEA), toluene diisocyanate (TDI), and a polypropylene glycol diol having a molecular weight of about 1000 (PPG 1025).

Example 2

Example Composition of an Outer Primary Fiber Optic Coating Modified with an Ethylenically Unsaturated Acid Functional Monomer

| COMPONENT | WEIGHT % |
| --- | --- |
| HEA-TDI-PPG1025-TDI-HEA* | 37.0 |
| Bisphenol A Diglycidyl Ether Diacrylate | 28.5 |
| Trimethylol Propane Triacrylate | 10.0 |
| Phenoxyethyl Acrylate | 20.0 |
| Thiodiethylene bis (3,5-di-tert-butyl-4-hydroxy) hydrocinnamate | 0.5 |

-continued

| COMPONENT | WEIGHT % |
|---|---|
| 1-Hydroxycyclohexyl phenyl ketone | 3.0 |
| Phosphoric Acid Acrylate (Ebecryl 170) | 1.0 |

*This oligomer is the reaction product of 2-hydroxy ethyl acrylate (HEA), toluene diisocyanate (TDI), and a polypropylene glycol diol having a molecular weight of about 1000 (PPG 1025).

Example 3

Example Composition of an Inner Primary Fiber Optic Coating Modified with a Tetraalkoxy Silane

| COMPONENT | WEIGHT % |
|---|---|
| HEA-(IPDI-PPG2010)$_{3.0}$-IPDI-HEA* | 62.98 |
| Ethoxylated nonylphenol acrylate | 27.26 |
| Thiodiethylene bis (3,5-di-tert-butyl-4-hydroxy)hydrocinnamate | 0.94 |
| 2,4,6-Trimethyl benzoyl diphenyl phosphine oxide | 0.47 |
| 1-Hydroxycyclohexyl phenyl ketone | 2.35 |
| Gamma mercaptopropyl trimethoxy silane | 1.0 |
| Tetraethoxy silane | 5.0 |

*This oligomer is the reaction product of 2-hydroxy ethyl acrylate (HEA), isophorone diisocyanate (IPDI), and a polypropylene glycol diol having a molecular weight of about 2000 (PPG 2010).

Example 4

Example Composition of an Outer Primary Fiber Optic Coating Modified with an Ethylenically Unsaturated Acid functional Monomer

| COMPONENT | WEIGHT % |
|---|---|
| HEA-(TDI-PTMG1000)-TDI-HEA* | 38.61 |
| Bisphenol A Diglycidyl Ether Diacrylate | 28.71 |
| Phenoxy ethyl acrylate | 9.90 |
| Thiodiethylene bis (3,5-di-tert-butyl-4-hydroxy) hydrocinnamate | 0.49 |
| Isobornyl acrylate | 9.90 |
| Hexane diol diacrylate | 8.42 |
| 2,4,6-Trimethyl benzoyl diphenyl phosphine oxide | 1.98 |
| 1-Hydroxycyclohexyl phenyl ketone | 0.99 |
| Phosphoric acid acrylate(Ebecryl 170) | 1.0 |

*This oligomer is the reaction product of 2-hydroxy ethyl acrylate (HEA), toluene diisocyanate (TDI), and a polytetramethylene glycol diol having a molecular weight of about 1000 (PTMG 1000).

The coating compositions according to Examples 1–4 show good adhesion, good adhesion retention and mechanical properties.

Example 5

Comparative Data Base Composition of an Inner Primary Fiber Optic Coating

| COMPONENT | WEIGHT % |
|---|---|
| HEA-(IPDI-PPG2010)$_{3.0}$-IPDI-HEA* | 66.00 |
| Ethoxylated nonylphenol acrylate | 30.00 |

-continued

| COMPONENT | WEIGHT % |
|---|---|
| Thiodiethylene bis (3,5-di-tert-butyl-4-hydroxy)hydrocinnamate | 1.00 |
| 2-Hydroxy-2-methyl-1-phenyl-1-propanone | 2.25 |
| Bis-(2,6-dimethoxybenzoyl)-2,4,4-trimethylpentyl-phosiphine oxide | 0.75 |

*This oligomer is the reaction product of 2-hydroxy ethyl acrylate (HEA), isophorone diisocyanate (IPDI), and a polypropylene glycol diol having a molecular weight of about 2000 (PPG 2010).

Coating formulations were prepared using the base composition described above. The composition of the coating compositions is given in Table 1 below. The coating compositions were tested for adhesion according to the following test procedure.

Adhesion test

Figure 3:
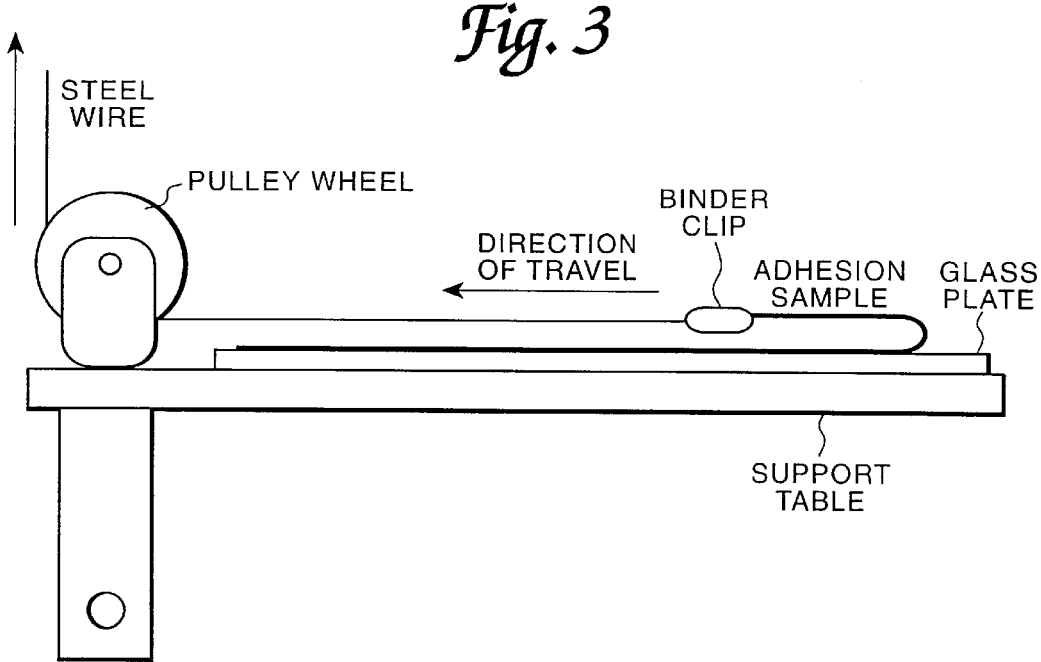
FIG. 3 shows an apparatus for measuring the adhesion of a coating composition to a glass substrate.

This adhesion test is used for determining the wet and ambient adhesion of a cured coating composition on a glass plate. The compositions are cured on a polished 20×20 cm glass plate, Alltech Associates (Deerfield, Ill.) catalog number 26080 using 1 joule per square centimeter of ultraviolet light, resulting in a nominal 75 micron cured film attached to the glass plate. 1-inch wide strips are cut from the film and tested in the apparatus shown in FIG. 3. The steel wire is connected to an Instron 4201 tensile tester. The crosshead speed is 10.00 inch/minute.

Before the 50% RH adhesion test, the films are conditioned for 7 days in an environmental chamber at 23° C./50% RH under atmospheric pressure. The strip to be tested is peeled back about 1 inch on one side and connected to the steel cable with a binder clip. The tensile test is carried out until the average force value becomes relatively constant. This constant average adhesion value (F) is measured and expressed in grams force/inch.

Before the 95% RH adhesion test, the films are conditioned for 7 days in an environment chamber at 23° C./50% RH under atmoshperic pressure. Then, the films are conditioned for 24 hours at 23° C./95%RH. The strip to be tested is peeled back about 1 inch on one side and connected to the steel cable with a binder clip. The tensile test is carried out until the average force value becomes relatively constant. This constant average adhesion value (F) is measured and expressed in grams force/inch.

For each composition two adhesion value (F) tests are made: a) at 50% relative humidity (50% RH adhesion) and b) at 95% relative humidity (95% RH adhesion). Each test is repeated twice. The adhesion retention (Q) is calculated as:

$$Q=F(95\% \text{ adhesion})/F(50\% \text{ adhesion}).$$

TABLE 1

Coating Compositions and Results of Adhesion Test
[Composition data in percents (w/w)]

| Composition | A | B | C | D | E | F | G | H |
|---|---|---|---|---|---|---|---|---|
| Base composition | 100 | 99.00 | 94.00 | 91.00 | 87.00 | 84.80 | 93.14 | 83.62 |
| Tetraethoxy Silane | — | — | — | 8.00 | 8.00 | 12.76 | 3.24 | 12.76 |
| Gamma Mercaptopropyl-Trimethoxy Silane | — | 1.00 | 1.00 | 1.00 | — | 0.41 | 1.59 | 1.59 |
| Vinylether Urethane Silane | — | — | 5.00 | — | 5.00 | 2.03 | 2.03 | 2.03 |
| 50% RH Adhesion* | 33 | 34 | 36 | 50 | 54 | 85 | 47 | 84 |
| 95% RH Adhesion* | 15 | 23 | 28 | 50 | 52 | 85 | 56 | 101 |
| Adhesion retention Q(%) | 45 | 68 | 78 | 100 | 96 | 100 | 119 | 120 |

*measured according to adhesion test expressed in gram force/inch

The compositions A, B and C, which contain no tetra-substituted compound show low adhesion retention values. High values for adhesion retention are found in examples D–H, which contain a tetrasubstituted compound.

Example 6

Comparative Data: Fiber Optic Coating Composition versus Dynamic Fatigue

The Dynamic fatigue value, $n_d$, of several optical fibers having various inner primary and outer primary coating compositions were measured in accordance with FOTP-76, which is part of the series of test procedures included with Recommended Standard EIA/TIA-455, except that the optical fiber had a 20 meter gauge length, the relative humidity was 100% and the fiber was tested by tension at 4.0% and 0.004% per minute.

All coating compositions were based on standard inner primary and outer primary coating compositions that are comprised of a urethane acrylate oligomer, standard diluents and a photoinitiator, except that in some compositions, about 10% by weight of the entire composition of a tetraalkoxy silane was added, and in other compositions, about 1% by weight of the entire composition of a strong acid functional ethylenically unsaturated monomer was added. Table 2 below summarized the results.

TABLE 2

Dynamic Fatigue values for Optical Fibers

| Optical Fiber No. | Inner Primary Coating Composition | Outer Primary Coating Composition | Dynamic Fatigue $n_d$ Value |
|---|---|---|---|
| 1 | Tetraalkoxy silane | Acid | 25 |
| 2* | Tetraalkoxy Silane | Acid | 27 |
| 3 | Tetraalkoxy Silane | Standard | 25 |
| 4 | Standard | Acid | 25 |
| 5 | Standard | Standard | 23.5 |

*Low cure dose
Standard = A standard coating composition as described above in comparative example A.
Tetraalkoxy Silane = A tetraalkoxy silane was added to the standard coating composition.
Acid = An acid functional monomer, specifically Ebecryl 170 was added to the standard coating composition.

Figure 4:
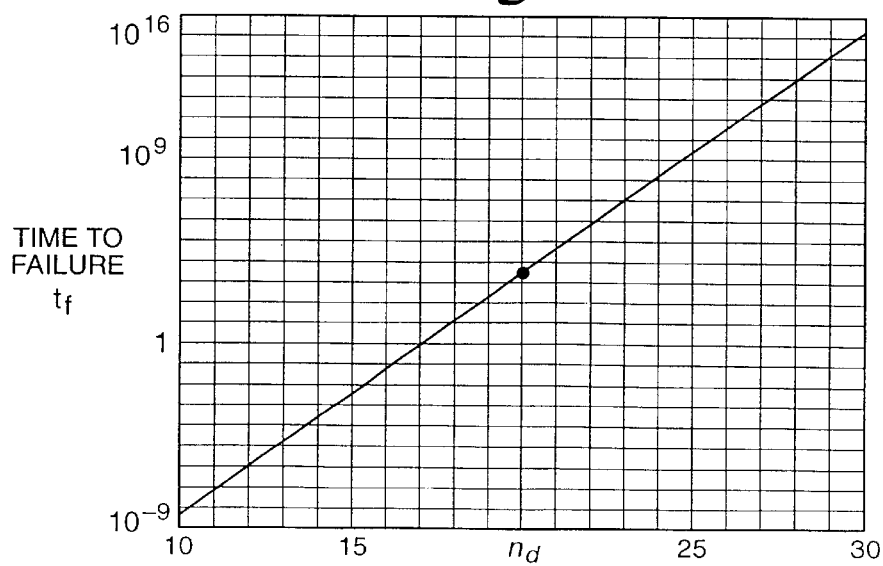
FIG. 4 is a graph that shows the relationship between between the dynamic fatigue value, $n_d$, and the time of failure, $T_f$, of an optical fiber.

The data show that when a tetraalykoxy silane is added to an inner primary coating, the dynamic fatigue value increases. Likewise, when a tetraalkoxy silane is added to both the inner primary coating and the outer primary coating, the dynamic fatigue value $n_d$ increases. Moreover, when a strong acid functional ethylenically unsaturated monomer is added to the outer primary coating and no tetraalkoxy silane is added to the inner or outer primary coatings, the dynamic fatigue value increases. FIG. 4 shows the relationship between the dynamic fatigue value and the time to failure of an optical fiber. It should be noted that the $n_d$ values are logarithmic so that an apparently small change in the $n_d$ value corresponds to a large change in the liftime to failure of an optical fiber. In Table 1 above, as $n_d$ increased from 23.5 to 25, the predicted time to failure, $T_f$, shows an increase of about two orders of magnitude. A more complete discussion of optical fiber lifetime theory may be found in the following article: "Theory and Measurement For Predicting Stressed Fiber Lifetime" by F Kapron and H Yuce in *Optical Engineering*, June 1991, Vol 30, No 6.

What is claimed is:

1. A coated optical fiber comprising an inner primary coating and an outer primary coating, said outer primary coating being obtained by curing a composition comprising:
   (i) a strong acid functional ethylenically unsaturated monomer; and
   (ii) a radiation-curable oligomer.

2. The coated optical fiber of claim 1, wherein said unsaturated monomer comprises an unsaturated moiety selected from the group consisting of vinyl, allyl, vinylether, methacrylate, and acrylate moieties.

3. The coated optical fiber of claim 1, wherein said unsaturated monomer comprises an acid group that completely dissociates in water.

4. The coated optical fiber of claim 1, wherein said unsaturated monomer is a phosphoric acid monoacrylate or a 2-acrylamido-2-methylpropane sulfonic acid.

5. The coated optical fiber of claim 1, wherein said coating has a modulus in the range of about 100 to about 3,000 MPa.

6. The coated optical fiber of claim 1, wherein said coating has a Tg above 23° C.

7. The coated optical fiber of claim 1, wherein said unsaturated monomer is present in said composition, relative to the total weight of said composition, in an amount of about 0.1 wt % to about 10 wt %.

8. The coated optical fiber of claim 1, wherein said radiation-curable oligomer is a urethane (meth)acrylate oligomer.

9. The coated optical fiber of claim 1, wherein said radiation-curable oligomer comprises polyether diol residues, polyisocyanate residues, and hydroxyfunctional ethylenically unsaturated monomer residues.

10. The coated optical fiber of claim 1, wherein said radiation-curable oligomer consists essentially of polyether diol residues, diisocyanate residues, and hydroxyethylacrylate residues.

11. The coated optical fiber of claim 1, wherein said radiation-curable oligomer is present in said composition, relative to the total weight of said composition, in an amount of 30–80 wt %.

12. The coated optical fiber of claim 1, wherein said radiation-curable oligomer has a molecular weight in the range of about 1,000 to 10,000.

13. The coated optical fiber of claim 1, wherein said composition further comprises a photoinitiator.

14. The coated optical fiber of claim 1, wherein said composition further comprises bisphenol A diglycidyl ether diacrylate.

15. An optical fiber ribbon comprising the coated optical fiber of claim 1.

16. An optical fiber ribbon comprising at least one optical fiber embedded in a matrix material, said matrix material being obtained by curing a composition comprising:
   (i) a strong acid functional ethylenically unsaturated monomer; and
   (ii) a radiation-curable oligomer.

17. The optical fiber ribbon of claim 16, wherein said unsaturated monomer comprises an unsaturated moiety selected from the group consisting of vinyl, allyl, vinylether, methacrylate, and acrylate moieties.

18. The coated optical fiber of claim 16, wherein said unsaturated monomer comprises an acid group that completely dissociated in water.

19. The optical fiber ribbon of claim 16, wherein said unsaturated monomer is a phosphoric acid monoacrylate or a 2-acrylamido-2-methylpropane sulfonic acid.

20. The optical fiber ribbon of claim 16, wherein said radiation-curable oligomer comprises polyether diol residues, polyisocyanate residues, and hydroxyfunctional ethylenically unsaturated monomer residues.

* * * * *